United States Patent [19]
van der Lely

[11] 4,344,636
[45] Aug. 17, 1982

[54] TANK FOR TRANSPORTING LIQUIDS

[76] Inventor: Cornelis van der Lely, Brüschenrain 7, Zug, Switzerland

[21] Appl. No.: 148,551

[22] Filed: May 9, 1980

[30] Foreign Application Priority Data

May 10, 1979 [NL] Netherlands .......................... 7903657

[51] Int. Cl.³ .............................................. B60P 3/22
[52] U.S. Cl. .................................... 280/5 C; 137/571; 220/22
[58] Field of Search ............... 280/5 C, 5 E, 5 F, 5 R; 220/22; 296/15; 137/571

[56] References Cited

U.S. PATENT DOCUMENTS

| 1,616,008 | 2/1927 | Stout | 220/22 |
|---|---|---|---|
| 1,897,161 | 2/1933 | Endacott | 280/5 D |
| 3,080,173 | 3/1963 | Johnson et al. | 280/5 C |
| 3,625,137 | 12/1971 | Johnson | 280/5 C |

FOREIGN PATENT DOCUMENTS

| 256638 | 8/1967 | Austria | 280/5 C |
|---|---|---|---|
| 465226 | 5/1950 | Canada | 280/5 C |
| 509603 | 1/1955 | Italy | 280/5 C |

Primary Examiner—Joseph F. Peters, Jr.
Assistant Examiner—Donn McGiehan
Attorney, Agent, or Firm—William B. Mason

[57] ABSTRACT

A tractor trailer, the trailer being a cylindrical tank for transporting liquid material having a set of supporting wheels about one-quarter of its length from its rear wall. On level ground, the tank is inclined downwardly forwardly at an angle of about 3.5° and has a framework extending from its front wall about midway of its height, a drawpin depending from the front of the frame for connection to the tractor being intersected by an extension of the tank's longitudinal center line. The frame supports a pressure-vacuum pump connected through a conduit to a dome at the rear of the tank for exerting pressure or creating a vacuum within the tank's interior. The tank has a central vertical baffle, extending its length and having openings at the top and bottom, and two transverse baffles which divide the tank into three parts of about equal volume also having openings at the top and the bottom. Pipes extend outboard from the tank's forward bottom which have ports. The tank's lower front is spaced behind the towing tractor's rear wheels and the height of the lowest part of the tank above the supporting surface is less than one-half of the diameter of the tank. At its lowest part screening or guard members are provided to protect the tank against damage by obstructions on the roadway when it is being towed.

14 Claims, 3 Drawing Figures

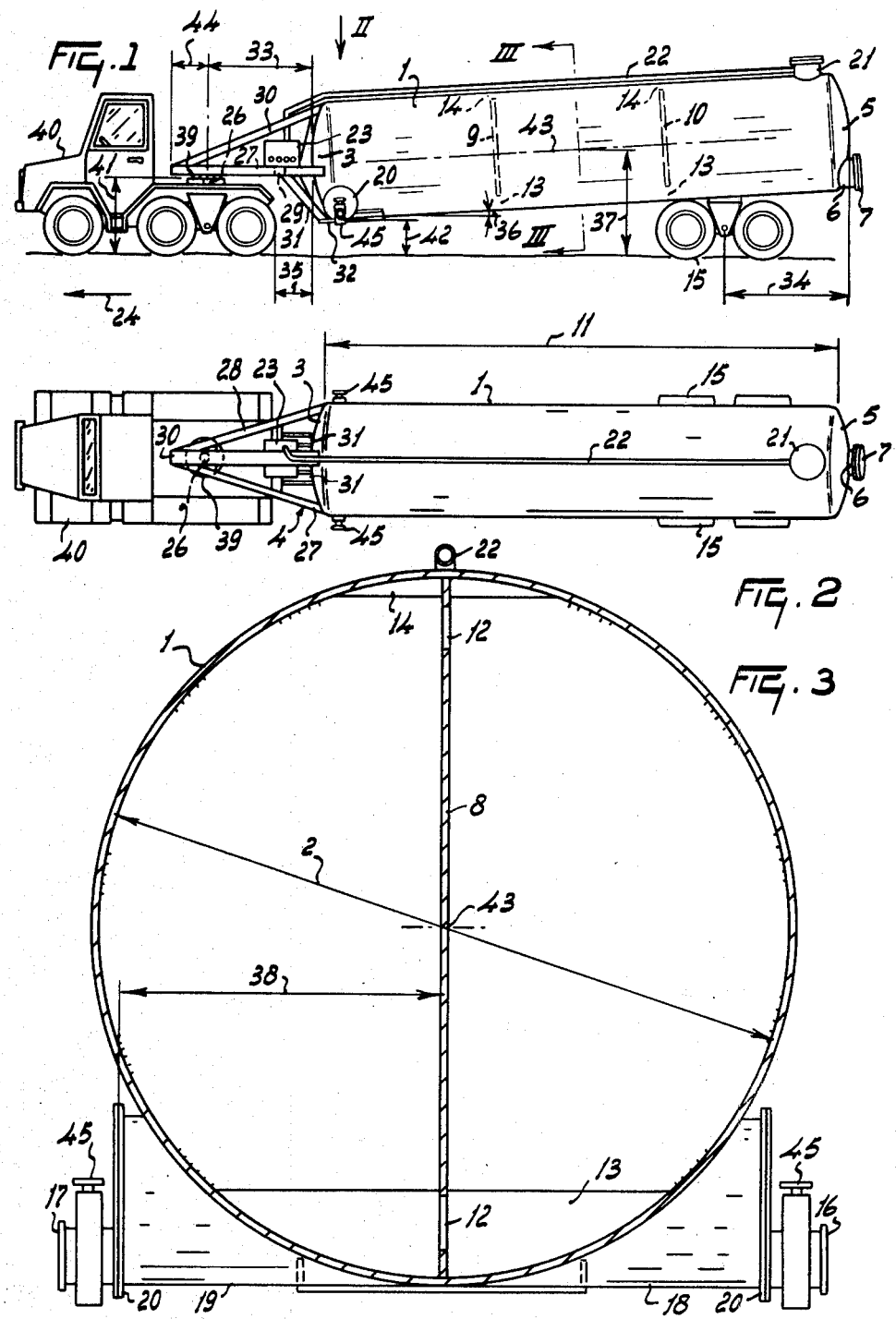

TANK FOR TRANSPORTING LIQUIDS

SUMMARY OF THE INVENTION

The invention relates to a tank for transporting liquid material comprising at least one set of supporting wheels and a towing connection for a draw member adapted for connection to a vehicle for towing the tank.

According to the invention the tank has its higher portion located near its supporting set of wheels and a lower portion having its forward retaining wall near its draw member for the towing vehicle. By this arrangement satisfactory and improved stability of the tank is obtained during travel, particularly in driving through and around curves or when changing speed or both wherein the tank's contents are unlikely to shift in place so as to jeopardize its road stability. When braking, especially, the contents of the tank will move forward in a manner so as not to cause accidents.

An advantageous embodiment of the tank according to the invention is obtained with the draw member for the towing vehicle located at a distance from the tank's forward retaining wall. The towing connection for the tank is thus located at a height which is generally independent of the tank's height in the vicinity of its supporting wheels and a relatively low-level center of gravity of the tank is thus obtained.

In a further embodiment of the invention, a tank for transporting liquid material comprising at least one set of supporting wheels and a towing connection or draw member for moving the tank, there also being an inlet or outlet opening near the draw member on at least one side of the tank. This opening is located at a low level so that heavy material is drawn into the tank with increased facility. For example, liquid material having a specific gravity exceeding that of water can be readily loaded into the tank. According to the invention the tank for transporting liquid comprises at least one supporting set of wheels and a towing connection or draw member. It is, at least substantially, cylindrical in shape and is provided with at least one longitudinal partition extending substantially in the direction of the tank's length. The longitudinal partition restricts the liquid material from moving transversely relative to the tank's direction of length. This results in improved road stability in making turns to such an extent that there is practically no risk of the tank skidding laterally or turning on its side when going around a curve due to a lateral shift of the tank's contents.

Other objects, adaptabilities and capabilities of the invention will be appreciated by those skilled in the art as the description progresses, reference being had to the accompanying drawings.

BRIEF DESCRIPTION OF THE DRAWINGS

FIG. 1 is a side elevation of a tank in accordance with the invention coupled with a tractor vehicle;

FIG. 2 is a plan view of the tank shown in FIG. 1 as seen from the direction of the arrow II in FIG. 1; and FIG. 3 is an enlarged sectional view of the tank taken on the line III—III in FIG. 1.

DESCRIPTION OF THE PREFERRED EMBODIMENT

The tank shown in the Figures comprises the compartment, which is the tank, per se, and is designated by reference numeral 1. It has a cylindrical cross-section, the diameter 2 of which is about 1.90 meters. With respect to its normal direction of movement, tank 1 has a front wall 3, in the proximity of which is arranged a draw frame 4 rigidly connected with tank 1. At its rear, tank 1 has a rear wall 5 in which the outlet opening of a pipe 6 constitutes a manhole having a cover 7.

Tank 1 comprises a longitudinal partition 8 which bisects the tank vertically and contains the tank's longitudinal centerline 43. This longitudinal partition 8 extends throughout the length of the tank between the forward wall 3 and rear wall 5, and also through the height of the tank. Two transverse partitions 9 and 10 which are spaced apart uniformly along the length of tank 1 extend at right angles to the longitudinal partition as seen in FIG. 1, and centerline 43 whereby tank 1 is general trisected by these partitions. Between the bottom of the tank and the lower side of transverse partitions 9 and 10, passages 13 are provided, whereas above the top side of transverse partitions 9 and 10, smaller passages 14 are provided between the upper edges of such partitions and the interior of the top side of the tank. On both sides of longitudinal partition 8, transverse partitions 9 and 10 are aligned and constitute mirror images of one another. The compartments of the tank space formed on both sides of the longitudinal partition 8 communicate through two or more openings 12 provided near the tank's top and bottom in the longitudinal partition 8. At least one such opening 12 is provided in the lowermost part of the tank near its front wall 3. The tank is provided with a set of wheels 15 comprising in this embodiment four wheels arranged on two tandem axles. The central part of such wheel set 15 is attached forward a distance 34 from the tank's rear wall 5 at the bottom of tank 1. Distance 34 is substantially equal to one-quarter of the tank's length. Under normal transport conditions the tank is inclined so its foremost part is at a lower level than its uppermost part near rear wall 5. The tank's inclination when on a level surface, angle 36, is about 3.5° relative to a horizontal plane.

Near the lowermost part, in the proximity of front wall 3, the tank is provided on both sides with pipes 16 and 17 forming inlet and outlet openings. Pipes 16 and 17, provided with closure comprising valves or cocks 45, are fastened to outlet parts 18 and 19, each of which has a cylindrical cross-section. Parts 18 and 19 are aligned with each other, as are pipes 16 and 17. The ends of outlet parts 18 and 19 are spaced a distance 38 from the tank's central plane (within partition 8) so that the outboard ends of such outlet parts are located at least in their upper aspects proximate to the sides of the tank as seen in cross-sectional view of FIG. 3. Pipes 16 and 17 extend in this embodiment a small distance beyond the sides of the tank. Pipes 16 and 17 are secured to closing plates or covers 20 for outlet parts 18 and 19.

Near the rear and at the uppermost aspect of the tank, a dome 21 is provided. A conduit 22 communicates with dome 21 and extends along the upper side of the tank towards forward wall 3. Conduit 22 connects with a pump 23 arranged on draw frame 4 forward of front wall 3. Pump 23 is a compression-vacccum producing pump.

Draw frame 4 is provided with a draw pin 26 which is fastened in its lower portion to a horizontal frame part comprising two forwardly converging frame beams 27 and 28. Beams 27 and 28 are fastened, viewed in plan, to the front of tank 1 at transversely opposite sides thereof. A transverse beam 29 is connected between frame beams 27 and 28, pump 23 being supported by such beam 29. Beams 27, 28 and 29 comprise a horizontal frame part of draw frame 4. Two struts 31 are secured between frame beam 29 and a screening plate 32 rigidly connected to the bottom side of the tank. A strut 30 is fastened at its rear end centrally to front wall 3 proximate the top of the tank, whereas its forward end is connected with interconnected beams 27 and 28 near the forward aspect of draw frame 4. At a short distance indicated by reference numeral 44 from the forward aspect of draw frame 4, draw pin 26 is arranged. Draw pin 26 is located a distance indicated by reference numeral 33 from the foremost part of front wall 3. Distance 33 is substantially equal to diameter 2 of tank 1. From the Figures it is to be observed that draw pin 26 is adapted to be coupled with a coupling plate 39 of a tractor vehicle 40. In the transport state, the part of draw frame 4 comprising beams 27 and 28 is in horizontal position, so that draw pin 26 is located proximate a prolongation of centerline 43 of tank 1. Draw pin 26 is located, in the transport state of the tank, at a height 41 above the ground which is about 1.20 meters. With draw pin 26 in this position where it is at the level of the center of the front end of tank 1 and with the depicted inclination of the tank, the tank's front end is located at a distance indicated by reference numeral 42 from the ground which is preferably smaller than, or approximately equal to one-half of height 41. In this embodiment, distance 42 of the lowermost part of the tank from the ground is about 55 centimeters. In the normal transport position of the tank, its center of gravity is located at a distance indicated by reference numeral 37 of about 1.80 meters above the ground. The tank preferably has a capacity of about 25,000 liters.

The tank according to the invention is suitable for transporting fluids. Such fluids may have a specific gravity equal to or lower than that of water or a specific gravity several times, for example, five times that of water. The tank is particularly suitable for transporting fluids on roads and highways. The construction of the tank is such that it practically precludes accidents due to movements of the fluid in the tank. In particular, when tank 1 is not completely filled during transport, there is a reduction in problems that occur due to movements of the fluid in the tank caused by speed variations or when turning.

The longitudinal partition 8 in the tank restricts the fluid from moving from one side to the other. Particularly when turning, there is a reduction of movement of fluid in the tank to one side by centrifugal force whereby the ease of turning would otherwise be more difficult. Transverse partitions 9 and 10 restrict movements of the fluid in the direction of the tank's length. These transverse partitions also restrict undesirable displacements of the fluid in the tank when turning.

The tank's inclined position in which it is lower in the front than the rear also has the effect of restricting undesirable movements of fluid within the tank. When the tank is only partly filled, fluid is accumulated primarily in the front part. Therefore, when making turns the fluid which is contained for the most part in the lower portion of the tank does not readily move transversely within the tank. As a result, the road stability of the tank in making turns is improved. Moreover, the tank's inclined position results in a relative low center of gravity when the tank is not completely filled which is also conducive to good road stability. With the outer openings of pipes 16 and 17 situated near the low front end of the tank, fluid is efficiently drawn into the tank. This is particularly advantageous for fluids of high specific gravities. The tank is filled by coupling a hose with one or both pipes 16 and 17. Before the tank is filled, a partial vacuum is created in the tank by means of pump 23 via dome 21 and conduit 22. Pump 23 may be driven in any desired manner such as, for example, by an internal combustion engine provided on draw frame 4. Alternatively, pump 23 may be driven by electric motors or hydraulically operated which, in turn, may be powered by a generator or hydraulic pump driven by prime mover 40. For removing the fluid, pump 23 is used to place a positive pressure in the tank so fluid discharged under pressure through pipes 16 and 17.

The low position of the tank's front end and hence of pipes 16 and 17 is obtained by situating draw frame 4 relative to tank 1 so that draw pin 26, in the normal transport position of the tank, is located at a considerably higher level than the lower part of the tank. In this embodiment, draw pin 26 is located to extend from the center of front end 3 of tank 1. Owing to the forwardly inclined position of the tank, its contents do not move forward readily during deceleration by braking; hazards in this respect are thereby avoided. The tank's low position is obtained because draw pin 26 is situated sufficiently forward of front end 3 that the rearmost wheels of prime mover 40 are spaced in front of the tank. In this embodiment the rearmost wheel of prime mover 40 is located a distance designated by reference numeral 35 from the tank's front end which is about the same as distances 42 and 44 and about one-half of height 41.

For cleaning the tank, covers 20 together with pipes 16 and 17 of outlet parts 18 and 19 can be removed. Cover 7 can also be removed from pipe 6.

Screening plate 32 provided on the bottom side at the forward low-level part of the tank is connected with draw frame 4 through struts 31. by this structure, forces exerted on screening plate 32, if the tank should hit any unevennesses or obstacle on the road, are effectively absorbed. Because the tank bears, through draw pin 26, on prime mover 40 and, more specifically, on wheel set 15, which is located at about a quarter of the length of the tank away from the rear wall (distance 33), the tank is satisfactorily supported at each degree of filling. The construction described furthermore ensures an advantageous position of the center of gravity of the tank at a distance of 1.80 meters from the ground.

Although the preferred embodiment of the invention has been described above, it is to be understood that it is capable of other adaptations and modifications within the scope of the appended claims.

Having thus described my invention, what I claim as new and desire to secure by Letters Patent of the United States is:

1. An elongated mobile tank for transporting liquid material including at least one set of supporting wheels intermediate the length of the tank and a front draw member for towing and supporting the forward end of the tank, said forward end being inclined downwardly from said wheels in the normal direction of travel and having a forward end wall, said draw member including a draw pin adapted for connection to a towing vehicle, said forward end being located, at least in part, at a lower level than said draw pin and immediately to the rear thereof, said tank comprising internal partition means with at least one restrictive opening that defines an uninterrupted space for liquids.

2. A tank as claimed in claim 1, wherein the tank is of cylindrical configuration and said draw pin is spaced forward from said end wall by a distance not greater than about the diameter of the tank.

3. A tank as claimed in claim 1, wherein said draw member comprises a frame which is secured to the front side of the tank, said draw pin being arranged on said frame.

4. A tank as claimed in claim 3, wherein said frame comprises an at least substantially horizontal frame part located at about midway of said the vertical tank dimension, said frame part being secured to said forward end of the tank.

5. A tank as claimed in claim 4, wherein said frame comprises a frame beam, a front aspect of said horizontal frame part being connected with an end of said frame beam, the other end of said frame beam being secured to the tank's said forward end at the upper aspect thereof.

6. A tank as claimed in claim 4, wherein said draw pin is arranged on the lower side of said horizontal frame part and a relatively short distance from the foremost side of said horizontal frame part.

7. A tank as claimed in claim 4, wherein said frame includes struts, said horizontal frame part being connected with said struts at said struts' forward parts and the rear parts of said struts being connected to said forward end of the tank near the bottom side thereof.

8. An elongated mobile tank for transporting liquid material including at least one set of supporting wheels intermediate the length of the tank and a front draw member for towing and supporting the forward end of the tank, said forward end being inclined downwardly from said wheels in the normal direction of travel and having a forward end wall, said draw member including a draw pin adapted for connection to a towing vehicle, said forward end being located, at least in part, at a lower level than said draw pin and immediately to the rear thereof, said tank comprising at least one longitudinal internal partition with at least one restrictive opening that defines two intercommunicating compartments, said partition extending in the direction of travel and being substantially vertical, whereby excessive liquid is restricted from flowing from one compartment to the other during transport around curves.

9. An elongated mobile tank for transporting liquid material including at least one set of supporting wheels intermediate the length of the tank and a front draw member for towing and supporting the forward end of the tank, said forward end being inclined downwardly from said wheels in the normal direction of travel and including a draw pin, said forward end being located, at least in part, at a lower level than said draw pin and having outlet means adjacent the lowermost portion of the forward tank end, said outlet means including aligned outlet parts that extend transverse and laterally from the tank sides, each outlet part including a respective closure.

10. A tank as claimed in claim 9, wherein each part is an enlarged pipe and said closure comprises a valve, a cover on said pipe and a further pipe with said valve therein extending outboard from said first mentioned pipe.

11. A tank as claimed in claim 10, wherein said aligned parts each extend from a central longitudinal plane of the tank in an outboard direction for a distance which is at least substantially equal to one-half of the horizontal width of the tank.

12. A tank as claimed in claim 9, wherein the tank is substantially uniform in cross-section and in transport position the lower part of the tank is at a lower level relative to the ground than substantially one-half the height between the ground and draw pin.

13. An elongated mobile tank for transporting liquid material including at least one set of supporting wheels intermediate the length of the tank and about midway between the center and rear of the tank, a front draw member for towing and supporting the forward end of the tank, said forward end being inclined downwardly from the tank rear in the normal direction of travel, said draw member including a draw pin adapted for connection to a towing vehicle, the forward portion of said tank being located, at least in part, at a lower level than said draw pin, said tank comprising internal transverse partition means with at least one restrictive opening that defines an uninterrupted storage space for liquids, said partition means resisting the sudden displacement of liquid due to deceleration forces during transport and braking.

14. A tank as claimed in claim 13, wherein said draw pin is located proximate the prolongation of the longitudinal center line of the tank.

* * * * *